(12) United States Patent
Dowlatkhah et al.

(10) Patent No.: US 10,694,368 B2
(45) Date of Patent: Jun. 23, 2020

(54) DYNAMIC UTILIZATION OF SERVICES BY A TEMPORARY DEVICE

(71) Applicants: AT&T INTELLECTUAL PROPERTY I, L.P., Atlanta, GA (US); AT&T Mobility II LLC, Atlanta, GA (US)

(72) Inventors: Sangar Dowlatkhah, Johns Creek, GA (US); Erie Lai Har Lau, Bellevue, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/369,895

(22) Filed: Mar. 29, 2019

(65) Prior Publication Data

US 2019/0230494 A1    Jul. 25, 2019

Related U.S. Application Data

(60) Continuation of application No. 15/910,903, filed on Mar. 2, 2018, now Pat. No. 10,278,061, which is a
(Continued)

(51) Int. Cl.
*H04W 4/00*   (2018.01)
*H04W 8/20*   (2009.01)
(Continued)

(52) U.S. Cl.
CPC ............ *H04W 8/20* (2013.01); *H04L 67/306* (2013.01); *H04W 4/14* (2013.01); *H04W 8/02* (2013.01);
(Continued)

(58) Field of Classification Search
CPC ......... H04W 8/20; H04W 8/02; H04W 12/06; H04W 4/14; H04L 67/306
(Continued)

(56) References Cited

U.S. PATENT DOCUMENTS 6,138,156 A    10/2000  Fletcher et al.
6,931,446 B1   8/2005   Cox et al.
(Continued)

OTHER PUBLICATIONS

Non-Final Office Action received for U.S. Appl. No. 14/821,425 dated Mar. 31, 2017, 18 pages.
(Continued)

*Primary Examiner* — Charles T Shedrick
(74) *Attorney, Agent, or Firm* — Amin, Turocy & Watson, LLP

(57) ABSTRACT

A system for dynamically providing or utilizing services and applications on a temporary or new device is provided. A user can send a message with a secure code that is forwarded to a home network associated with the user. The home network can initiate transferring data from an application repository on the home network to the visited network which can then install the application through over the air programming. Once installed on the device, the application can send authentication information including the subscriber identity module (SIM) information to a virtual SIM database on the visiting carrier or home carrier networks to enable the application and services on the temporary or new device.

20 Claims, 10 Drawing Sheets

Related U.S. Application Data division of application No. 14/821,450, filed on Aug. 7, 2015, now Pat. No. 9,942,747.

(51) Int. Cl.
    *H04W 8/02*     (2009.01)
    *H04W 4/14*     (2009.01)
    *H04W 12/06*     (2009.01)
    *H04L 29/08*     (2006.01)
    *H04W 8/06*     (2009.01)

(52) U.S. Cl.
    CPC ............ *H04W 8/205* (2013.01); *H04W 12/06* (2013.01); *H04W 8/06* (2013.01)

(58) Field of Classification Search
    USPC ............................ 455/435.1, 433; 709/225
    See application file for complete search history.

(56) References Cited

U.S. PATENT DOCUMENTS

| | | |
|---|---|---|
| 7,581,030 B2 | 8/2009 | Dowling |
| 7,890,576 B2 | 2/2011 | Button et al. |
| 8,046,462 B2 | 10/2011 | Trappeniers et al. |
| 8,316,237 B1 | 11/2012 | Felsher et al. |
| 8,360,975 B1 | 1/2013 | Schwieterman et al. |
| 8,381,081 B1 | 2/2013 | Subbiah et al. |
| 8,483,191 B2 | 7/2013 | Erdman et al. |
| 8,750,123 B1 | 6/2014 | Alisawi |
| 8,868,661 B2 | 10/2014 | Asawa et al. |
| 8,984,282 B1 | 3/2015 | Kragh |
| 9,065,936 B2 | 6/2015 | Goldner et al. |
| 9,092,643 B2 | 7/2015 | Keoh et al. |
| 10,395,042 B2 | 8/2019 | Agarwal et al. |
| 10,530,580 B1 | 1/2020 | Walker |
| 2001/0049790 A1 | 12/2001 | Faccin et al. |
| 2003/0041048 A1 | 2/2003 | Balasuriya |
| 2003/0105827 A1 | 6/2003 | Tan et al. |
| 2003/0191663 A1 | 10/2003 | Sameh |
| 2004/0203648 A1 | 10/2004 | Wong |
| 2005/0050017 A1 | 3/2005 | Ross et al. |
| 2005/0223222 A1 | 10/2005 | Graves et al. |
| 2006/0031941 A1 | 2/2006 | Xiao et al. |
| 2006/0041470 A1 | 2/2006 | Filho et al. |
| 2007/0027715 A1 | 2/2007 | Gropper et al. |
| 2007/0043594 A1 | 2/2007 | Lavergne |
| 2007/0055545 A1 | 3/2007 | Maughan et al. |
| 2007/0061393 A1 | 3/2007 | Moore |
| 2007/0086475 A1 | 4/2007 | Clemens et al. |
| 2007/0157022 A1 | 7/2007 | Blom et al. |
| 2007/0192140 A1 | 8/2007 | Gropper |
| 2008/0133716 A1 | 6/2008 | Rao et al. |
| 2008/0293411 A1 | 11/2008 | Hinton et al. |
| 2009/0259493 A1 | 10/2009 | Venon et al. |
| 2010/0151841 A1 | 6/2010 | Metcalf et al. |
| 2010/0262545 A1 | 10/2010 | Herlitz |
| 2010/0311402 A1 | 12/2010 | Srinivasan et al. |
| 2010/0311418 A1 | 12/2010 | Shi et al. |
| 2010/0312852 A1 | 12/2010 | Kamga et al. |
| 2010/0332258 A1 | 12/2010 | Dahlke et al. |
| 2011/0021140 A1 | 1/2011 | Binier |
| 2011/0028135 A1* | 2/2011 | Srinivasan ........ H04M 3/42382 455/415 |
| 2011/0119088 A1 | 5/2011 | Gunn |
| 2011/0197237 A1 | 8/2011 | Turner |
| 2011/0225007 A1 | 9/2011 | Theis |
| 2011/0243553 A1 | 10/2011 | Russell |
| 2011/0264460 A1 | 10/2011 | Jagemann et al. |
| 2011/0282688 A1 | 11/2011 | Raggousis |
| 2012/0084092 A1 | 4/2012 | Kozuch et al. |
| 2012/0093303 A1 | 4/2012 | Schultz |
| 2012/0101847 A1 | 4/2012 | Johnson et al. |
| 2012/0124651 A1 | 5/2012 | Ganesan et al. |
| 2012/0155387 A1 | 6/2012 | Simmons et al. |
| 2012/0172089 A1 | 7/2012 | Bae et al. |
| 2012/0277543 A1 | 11/2012 | Homchowdhury et al. |
| 2012/0311657 A1 | 12/2012 | Boldyrev et al. |
| 2012/0314644 A1 | 12/2012 | Lagerman |
| 2012/0323691 A1 | 12/2012 | McLaughlin et al. |
| 2013/0018671 A1 | 1/2013 | Hussam |
| 2013/0035063 A1 | 2/2013 | Fisk et al. |
| 2013/0090942 A1 | 4/2013 | Robinson et al. |
| 2013/0122863 A1 | 5/2013 | Chen et al. |
| 2013/0124523 A1 | 5/2013 | Rogers et al. |
| 2013/0132109 A1 | 5/2013 | Mruthyunjaya et al. |
| 2013/0159288 A1 | 6/2013 | Nikankin |
| 2013/0231948 A1 | 9/2013 | Kim et al. |
| 2013/0246084 A1 | 9/2013 | Parmanto et al. |
| 2013/0262155 A1 | 10/2013 | Hinkamp |
| 2013/0290439 A1 | 10/2013 | Blom |
| 2013/0297821 A1 | 11/2013 | Tanenbaum et al. |
| 2013/0304486 A1 | 11/2013 | Jagemann et al. |
| 2013/0326579 A1 | 12/2013 | Bhatti et al. |
| 2013/0329552 A1 | 12/2013 | Carnero Ros et al. |
| 2013/0346954 A1 | 12/2013 | Tryon et al. |
| 2014/0004854 A1 | 1/2014 | Veran et al. |
| 2014/0039912 A1 | 2/2014 | Turinas et al. |
| 2014/0047526 A1 | 2/2014 | Huang |
| 2014/0115507 A1 | 4/2014 | Bailey et al. |
| 2014/0122119 A1 | 5/2014 | Hardy |
| 2014/0172366 A1 | 6/2014 | Hannebutte |
| 2014/0180719 A1 | 6/2014 | Bell et al. |
| 2014/0185521 A1 | 7/2014 | Aksu et al. |
| 2014/0207686 A1 | 7/2014 | Experton |
| 2014/0247716 A1 | 9/2014 | Xiao et al. |
| 2014/0254491 A1 | 9/2014 | Lindholm et al. |
| 2014/0343989 A1 | 11/2014 | Martini |
| 2014/0380044 A1 | 12/2014 | Ashley et al. |
| 2015/0004967 A1 | 1/2015 | Jiang |
| 2015/0006723 A1 | 1/2015 | Sheth et al. |
| 2015/0009826 A1 | 1/2015 | Ma et al. |
| 2015/0026461 A1 | 1/2015 | Devi |
| 2015/0039341 A1 | 2/2015 | Markman et al. |
| 2015/0070516 A1 | 3/2015 | Shoemake et al. |
| 2015/0074409 A1 | 3/2015 | Reid et al. |
| 2015/0101066 A1 | 4/2015 | Fram |
| 2015/0147990 A1 | 5/2015 | Kreitzer et al. |
| 2015/0172993 A1 | 6/2015 | Jiang |
| 2015/0188843 A1 | 7/2015 | Chauhan et al. |
| 2015/0213195 A1 | 7/2015 | Blechman |
| 2015/0245241 A1 | 8/2015 | Posz |
| 2015/0296368 A1 | 10/2015 | Kaufman et al. |
| 2015/0302148 A1 | 10/2015 | Fielder |
| 2015/0309516 A1 | 10/2015 | Williams et al. |
| 2015/0381571 A1 | 12/2015 | Plasse et al. |
| 2016/0006571 A1 | 1/2016 | Teittinen et al. |
| 2016/0029160 A1 | 1/2016 | Theurer et al. |
| 2016/0034713 A1 | 2/2016 | Ramirez |
| 2016/0085915 A1 | 3/2016 | Seow |
| 2016/0088461 A1 | 3/2016 | Jiang |
| 2016/0099935 A1 | 4/2016 | Luskin et al. |
| 2016/0125471 A1 | 5/2016 | Hsu et al. |
| 2016/0127777 A1 | 5/2016 | Roberts et al. |
| 2016/0142878 A1 | 5/2016 | Saulnier |
| 2016/0156770 A1 | 6/2016 | Vendrow |
| 2016/0170991 A1 | 6/2016 | Birchall |
| 2016/0180033 A1 | 6/2016 | Rosenberg |
| 2016/0203123 A1 | 7/2016 | Kozloski et al. |
| 2016/0210416 A1 | 7/2016 | Whitehurst |
| 2016/0210427 A1 | 7/2016 | Mynhier et al. |
| 2016/0260002 A1 | 9/2016 | Hill et al. |
| 2016/0269891 A1 | 9/2016 | Chen et al. |
| 2016/0275248 A1 | 9/2016 | Kim et al. |
| 2016/0277368 A1 | 9/2016 | Narayanaswamy et al. |
| 2016/0285998 A1 | 9/2016 | Hardy |
| 2016/0295544 A1 | 10/2016 | Jiang et al. |
| 2016/0314299 A1 | 10/2016 | Almer |
| 2016/0315902 A1 | 10/2016 | Silva et al. |
| 2016/0342767 A1 | 11/2016 | Narasimhan et al. |
| 2017/0118622 A1 | 4/2017 | Jiang |
| 2017/0134516 A1 | 5/2017 | Gutman et al. |

(56) References Cited

U.S. PATENT DOCUMENTS

2017/0243028 A1     8/2017   LaFever et al.
2019/0113973 A1     4/2019   Coleman et al.

OTHER PUBLICATIONS

Final Office Action received for U.S. Appl. No. 14/821,425 dated Sep. 7, 2017, 22 pages.
Non-Final Office Action received for U.S. Appl. No. 14/821,425 dated Jan. 8, 2018, 21 pages.
Notice of Allowance received for U.S. Appl. No. 14/821,425 dated Jul. 31, 2018, 47 pages.
Non-Final Office Action received for U.S. Appl. No. 14/827,028 dated Apr. 5, 2017, 50 pages.
Non-Final Office Action received for U.S. Appl. No. 14/821,450 dated May 31, 2017, 22 pages.
Non-Final Office Action received for U.S. Appl. No. 14/836,550 dated Aug. 24, 2017, 43 pages.
Final Office Action received for U.S. Appl. No. 14/827,028 dated Sep. 1, 2017, 58 pages.
Notice of Allowance received for U.S. Appl. No. 14/821,450 dated Nov. 28, 2017, 26 pages.
Non-Final Office action received for U.S. Appl. No. 14/827,028 dated Mar. 30, 2018, 53 pages.
Non-Final Office Action received for U.S. Appl. No. 14/929,897 dated May 24, 2018, 43 pages.
Non-Final Office Action received for U.S. Appl. No. 15/910,903 dated Aug. 27, 2018, 29 pages.
Office Action dated May 30, 2019 for U.S. Appl. No. 14/827,028, 53 pages.
Non-Final Office Action received for U.S. Appl. No. 16/023,579 dated Oct. 2, 2018, 37 pages.
Final Office Action received for U.S. Appl. No. 14/827,028 dated Oct. 29, 2018, 51 pages.
Non-Final Office Action received for U.S. Appl. No. 14/929,897 dated Aug. 8, 2019, 25 pages.
Notice of Allowance received for U.S. Appl. No. 14/827,028 dated Dec. 11, 2019, 68 pages.
Notice of Allowance dated Mar. 25, 2020 for U.S. Appl. No. 16/174,604, 59 pages.
Office Action dated May 1, 2020 for U.S. Appl. No. 14/929,897, 33 pages.

\* cited by examiner

DYNAMIC UTILIZATION OF SERVICES BY A TEMPORARY DEVICE

RELATED APPLICATIONS

The subject application is a continuation of, and claims priority to each of, U.S. patent application Ser. No. 15/910,903, filed Mar. 2, 2018, and entitled "DYNAMIC UTILIZATION OF SERVICES BY A TEMPORARY DEVICE," which is a divisional of U.S. patent application Ser. No. 14/821,450 (now U.S. Pat. No. 9,942,747), filed Aug. 7, 2015, and entitled "DYNAMIC UTILIZATION OF SERVICES BY A TEMPORARY DEVICE," the entirety of which applications are hereby incorporated by reference herein.

TECHNICAL FIELD

The subject disclosure relates to dynamically providing services, and utilization thereof, by a temporary device in a wireless communication environment.

BACKGROUND

Mobile carrier services are typically based on subscriber identity module (SIM) authentication via subscriber profiles. When moving to a different network, the device can roam on a visited network or the SIM card can be exchanged to use local services. If a new or temporary device is required, however, the device will have merely basic functionality since a subscriber's previous applications and services are not yet available on the new device.

DETAILED DESCRIPTION

Figure 1:
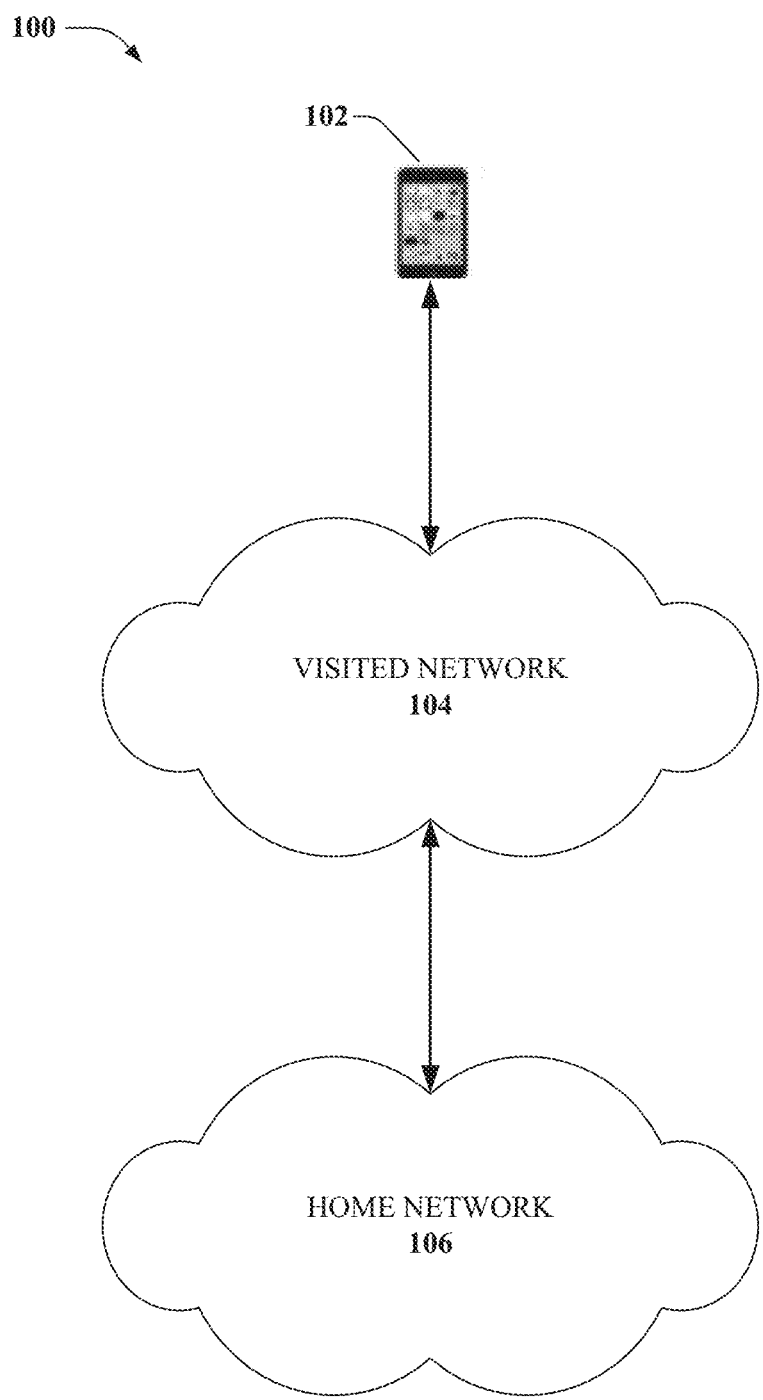
FIG. 1 illustrates an example, non-limiting embodiment of a block diagram of a system comprising a mobile device communicatively coupled to a visited network in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In one or more embodiments, a system for dynamically providing utilization of services and applications on a temporary or new device is provided. A user can send a message with a secure code that is forwarded to a home network associated with the user. The home network can initiate transferring data from an application repository on the home network to the visited network which can then install the application through an over the air software delivery subsystem. Once installed on the new or temporary device, the application can send authentication information including the subscriber identity module (SIM) information to a virtual SIM database on the visiting carrier or home carrier networks over alternative communication channel defined in the over the air the delivered software to associate the new SIM with an existing mobile subscriber integrated services for digital network number (MSISDN) in order to enable the application and services on the new or temporary device. Once this is completed, the new or temporary device is capable of using the same services as if the user's original device with the original SIM identity were being utilized. When the user is finished with the new or temporary device, the new or temporary device can be manually or remotely wiped.

For these considerations as well as other considerations, in one or more embodiments, a system comprises a processor and a memory that stores executable instructions that, when executed by the processor, facilitate performance of operations, comprising receiving, from a visited network device of a visited network to which a mobile device (e.g., temporary device, new device, etc.) is communicatively coupled, a request to use a service from the mobile device, wherein the service is enabled by a software application executed by the mobile device. The operations also comprise in response to forwarding the request to a home network device of a home network associated with the mobile device, receiving data representing the software application from the home network device. The operations also comprise initiating a wireless transmission of the software application directed to the mobile device.

In another embodiment, a method comprises receiving, by a device comprising a processor from a visited network device of a visited network to which a user equipment (e.g., temporary device, new device, etc.) is communicatively coupled, a message from the user equipment comprising an authorization code for a service enabled by an application executed by the user equipment. The method also comprises transmitting, by the device, the message to a home network device of a home network associated with the user equipment. The method also comprises receiving, by the device, application data representing the application from an application repository of the home network. The method can also comprise facilitating, by the device, installation of the application on the user equipment via an over the air software delivery of the visited network.

In another embodiment, a machine-readable storage medium, comprising executable instructions that, when executed by a processor, facilitate performance of operations comprising receiving, from a first network device of a visited network, a request to install an application on a user equipment communicably coupled to the visited network, wherein the request comprises a security code. The operations also comprise matching the security code with corresponding information represented in a cloud profile account stored by a second network device of a home network. The operations further comprise sending application data relating to the application received from an application repository to the visited network and initiating programming of the application on the user equipment using over the air software delivery via the first network device of the visited network.

Turning now to FIG. 1, illustrated is an example, non-limiting embodiment of a block diagram of a system (100), e.g., a dynamic secure mobile network system, comprising a mobile device 102 (e.g., temporary device, new device, etc.) on a visited network in accordance with various aspects described herein.

Visited network 104 and home network 106 can be mobile broadband networks that generally comprise a radio access network that facilitates communications between mobile devices and a core network. In the case of Long Term Evolution ("LTE") networks and other 3rd Generation Partnership Project ("3GPP") compliant networks (e.g., LTE Advanced) and even non-3GPP systems such as WiMAX and CDMA2000, these networks are the radio access network and an evolved packet core network that can contain a series of components that provide mobile data and control management. The dynamic secure mobile network system disclosed herein can be utilized in a network that comprises base station devices (eNodeBs) and Wi-Fi access points and other network access points. In some embodiments, the dynamic secure mobile network system can be operable with user equipment or networked devices that are not directly attached to a mobile network system but rather have wireline networked access. For the sake of simplicity, throughout this application, reference will be made to a mobile network, but the subject matter disclosed herein can be operable in any networked environment.

In an embodiment, visited network 104 can be in communication with a mobile device, a user equipment, etc. (e.g., 102). In some embodiments, the user equipment can be a mobile device, tablet, laptop, or desktop computer, or any other computing device.

Visited network 104 and home network 106 are based on their relationship to a subscriber or user who is using the mobile device. Typically, if a mobile device were to roam on a visited network a corresponding subscriber identity module or SIM card would have an active subscription with the home network and the visited network would allow connections to be made to the mobile device. As used in this application, home and visited refer to the relationship with the user, and not necessarily are limited to the SIM card. For instance, the mobile device can have a SIM card that has an active subscription with visited network 104, and thus in the traditional sense, visited network 104 is actually the home network, but as used in the present disclosure, the visited network 104 is the visited network since the user may have an active subscription with the home network 106 on another device, and mobile device is a temporary device or new device.

The mobile device may not have the same applications installed or services available that the user has on another device, e.g., original device (not shown), on the home network 106. To remedy this, the subject disclosure provides a system and method for enabling the user to use those services on the mobile device. The mobile device can send a text message (e.g., a short message service "SMS" text) to a number on the visited network 104 with an authorization code. A short message service center (SMSC) on the visited network 104 can forward the message to an SMSC on the home network 106. In some embodiments, the number that the mobile device sends the text message to can be a number associated with the home network 106, and the visited network 104 relays the message to the home network 106. In other embodiments however, the message can be sent to a number associated with the visited network 104, and based on the authorization code within the message or on some other basis, the SMSC on the visited network 104 can forward the message to the home network SMSC.

If the authorization code is correct, the SMSC on the home network 106 can indicate to an over the air subsystem on the home network 106 to transfer data associated with the application or service indicated in the message or authorization code to an over the air subsystem on the visited network 104. The over the air subsystem on the home network 106 can transfer the data from an application repository on the home network 106. The over the air subsystem can also transfer data associated with a profile account such as preference information, configuration information, and other profile information. The profile information can be used to setup and configure the application on the mobile device.

The visited network 104 can receive the application data, and initiate transfer of the data to the mobile device via over the air programming. Once the data transfer has completed, the over the air subsystem can initiate installation of the application on the mobile device. Once the application is installed on the mobile device, and the application is activated, the mobile device can transmit identifying information to the visited network 104 in order to authorize and/or enable the application on the mobile device. The identifying information can include the international mobile subscriber identity (IMSI), the mobile subscriber integrated services for digital network number (MSISDN), or other information related to the mobile device and the SIM identity. The identifying information can be sent to a virtual SIM database on either the home network 106 or visited network 104 for verification. Once this is done, a temporary mobile device (e.g., 102, 202, 302) is enabled to use the same services and applications as the user's original device (not shown) on the home network 106 with the original SIM identity.

Figure 2:
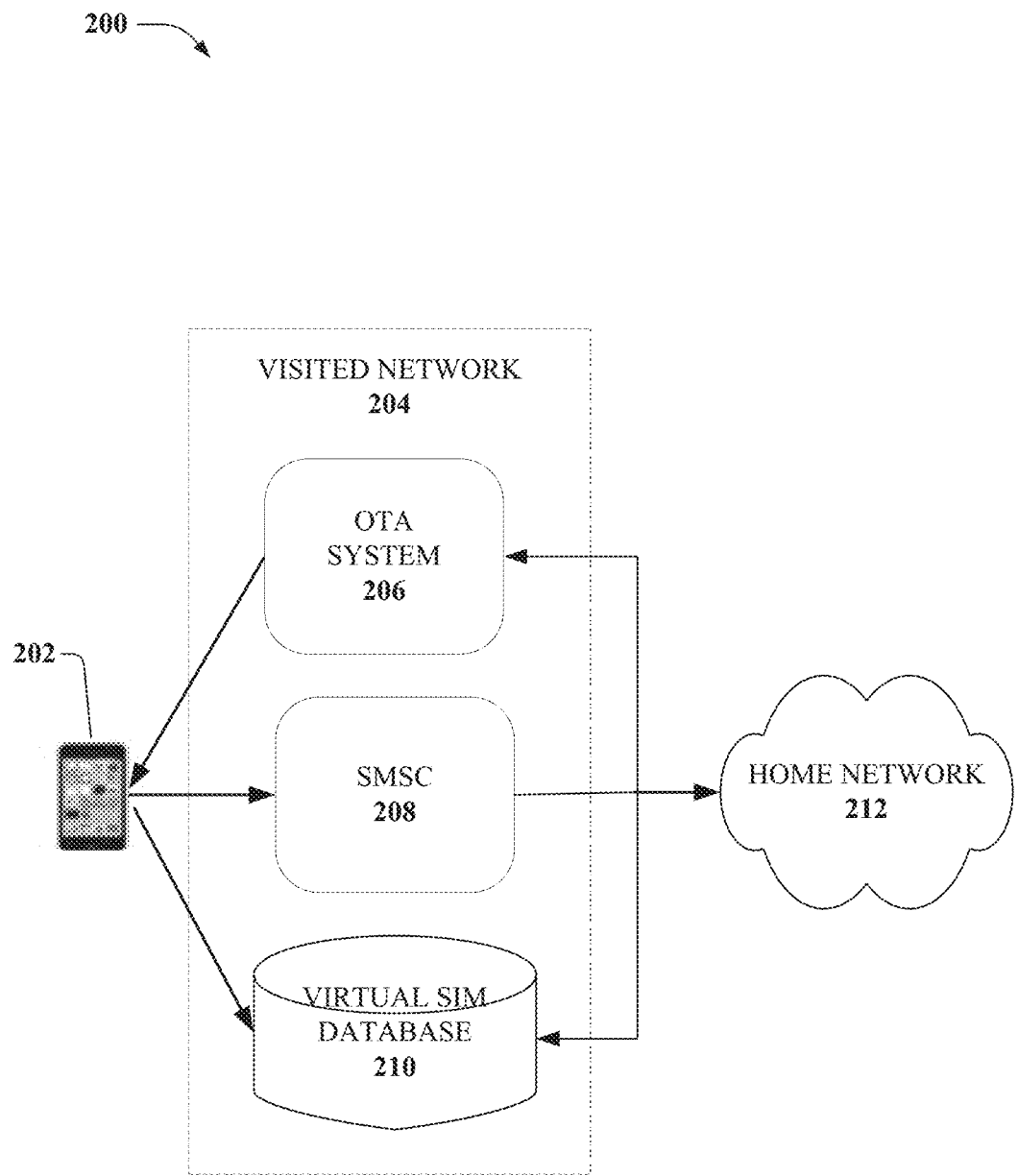
FIG. 2 illustrates an example, non-limiting embodiment of a block diagram of a system comprising a mobile device dynamically being provided with services in accordance with various aspects described herein.

Turning now to FIG. 2, illustrated is an example, non-limiting embodiment of a block diagram of a system (200) comprising a mobile device 202 dynamically being provided with services in accordance with various aspects described herein. The embodiment in FIG. 2 illustrates in more detail the systems and components of the visited network (e.g., 204) as described earlier in FIG. 1.

If a user starts using a new or temporary device while on a different network than their home network, the system disclosed herein can dynamically provision the temporary mobile device (e.g., 202, 302) with the applications and services that the original device (not shown) had on a home network (e.g., 212).

The temporary mobile device may not have the same applications installed or services available that the user has on another device on the home network 212. To remedy this, the subject disclosure provides a system and method for enabling the user to use those services on mobile device 202, e.g., the temporary mobile device. The mobile device 202 can send a text message (e.g., a short message service "SMS" text) to a number on the visited network 204 with an authorization code. A SMSC 208 on the visited network 204 can forward the message to an SMSC on the home network 212. In some embodiments, the number that the mobile device 202 sends the text message to can be a number associated with the home network 212, and the visited network 204 relays the message to the home network 212. In other embodiments however, the message can be sent to a number associated with the visited network 204, and based on the authorization code within the message or on some other basis, the SMSC 208 can forward the message to the home network SMSC.

If the authorization code is correct, the SMSC on the home network 212 can indicate to an over the air subsystem on the home network 212 to transfer data associated with the application or service indicated in the message or authorization code to an over the air system 206 on the visited network 204. The over the air subsystem on the home network 212 can transfer the data from an application repository on the home network 212. The over the air subsystem on the home network 212 can also transfer data associated with a profile account such as preference information, configuration information, and other profile information. The profile information can be used to setup and configure the application on the mobile device 202.

The over the air system 206 can receive the application data, and initiate transfer of the data to the mobile device 202 via over the air programming. Once the data transfer has completed, the over the air subsystem can initiate installation of the application on the mobile device 202. Once the application is installed on the mobile device 202, and the application is activated, the mobile device 202 can transmit identifying information to the visited network 204 in order to authorize and/or enable the application on the mobile device 202. The identifying information can include the international mobile subscriber identity (IMSI), the mobile subscriber integrated services for digital network number (MSISDN), or other information related to the mobile device 202 and the SIM identity. The identifying information can be sent to a virtual SIM database on either the home network 212 or visited network 204 (e.g., virtual SIM database 210) for verification. Once this is done, the temporary mobile device is enabled to use the same services and applications as the user's original device (not shown) on the home network 212 with the original SIM identity.

Figure 3:
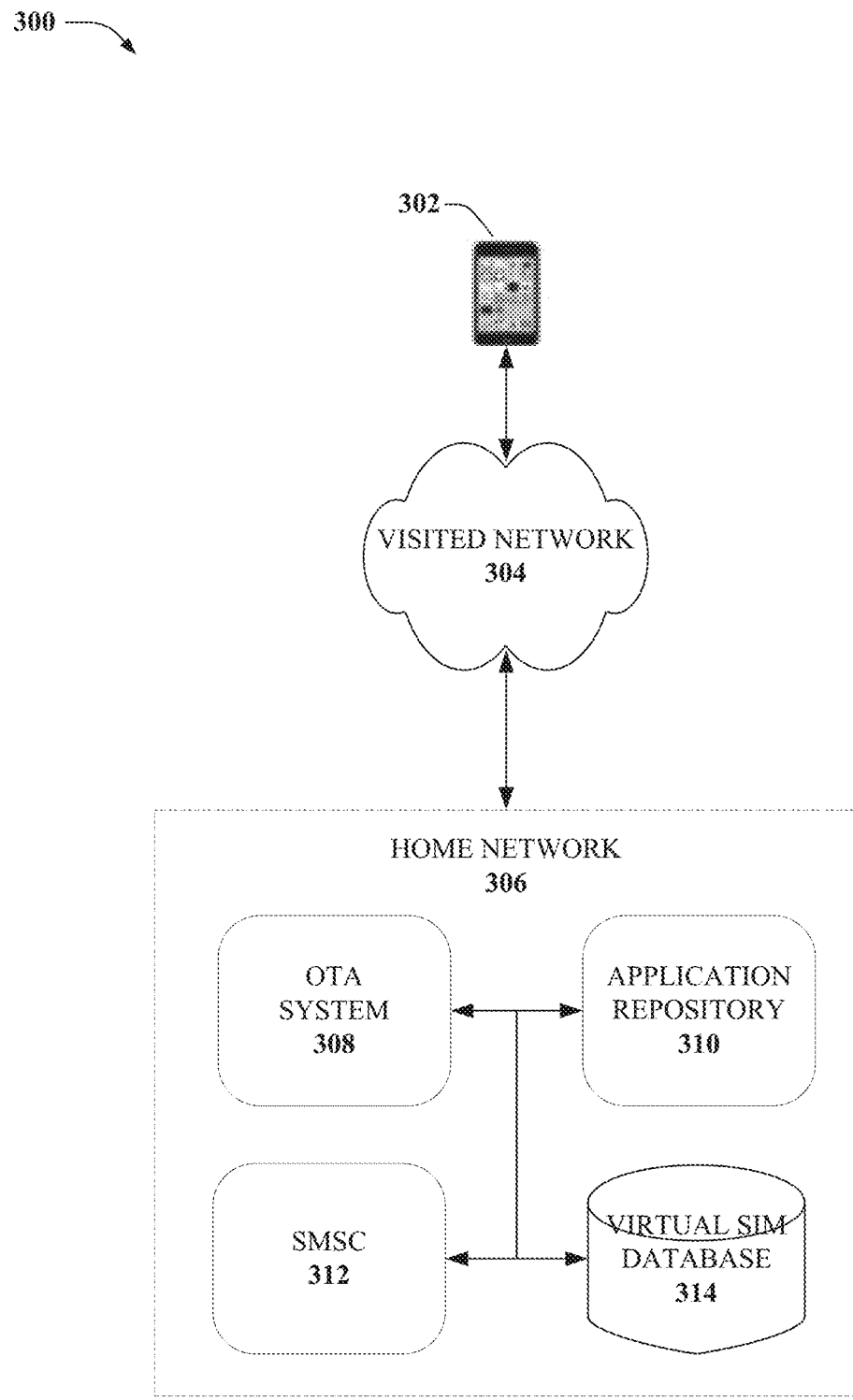
FIG. 3 illustrates an example, non-limiting embodiment of a block diagram of a system comprising a mobile device dynamically being provided with services in accordance with various aspects described herein.

Turning now to FIG. 3, illustrated is an example, non-limiting embodiment of a block diagram of a system (300) comprising a mobile device dynamically being provided with services in accordance with various aspects described herein. The embodiment in FIG. 3 shows in more detail the systems and components of the visited network (e.g., 304) as described earlier in FIG. 1.

The mobile device 302 can send a text message (e.g., a short message service "SMS" text) to a number on the visited network 304 with an authorization code. An SMSC on the visited network 304 can forward the message to SMSC 312 on the home network 306. In some embodiments, the number that the mobile device 302 sends the text message to can be a number associated with the home network 306, and the visited network 304 relays the message to the home network 306. In other embodiments however, the message can be sent to a number associated with the visited network 304, and based on the authorization code within the message or on some other basis, the visited network 304 can forward the message to the home network SMSC 312.

If the authorization code is correct, the SMSC 312 on the home network 306 can indicate to an over the air 308 on the home network 306 to transfer data associated with the application or service indicated in the message or authorization code to an over the air system on the visited network 304. The over the air subsystem on the home network 306 can transfer the data from an application repository on the home network 306. The over the air subsystem 308 on the home network 306 can also transfer data associated with a profile account such as preference information, configuration information, and other profile information. The profile information can be used to setup and configure the application on the mobile device 302.

The over the air system on the visited network 304 can receive the application data, and initiate transfer of the data to the mobile device 302 via over the air programming. Once the data transfer has completed, the over the air subsystem can initiate installation of the application on the mobile device 302. Once the application is installed on the mobile device 302, and the application is activated, the mobile device 302 can transmit identifying information to the visited network 304 in order to authorize and/or enable the application on the mobile device 302. The identifying information can include the international mobile subscriber identity (IMSI), the mobile subscriber integrated services for digital network number (MSISDN), or other information related to the mobile device 202 and the SIM identity. The identifying information can be sent to virtual SIM database 314 on the home network or a virtual SIM database on the visited network 304.

Figure 4:
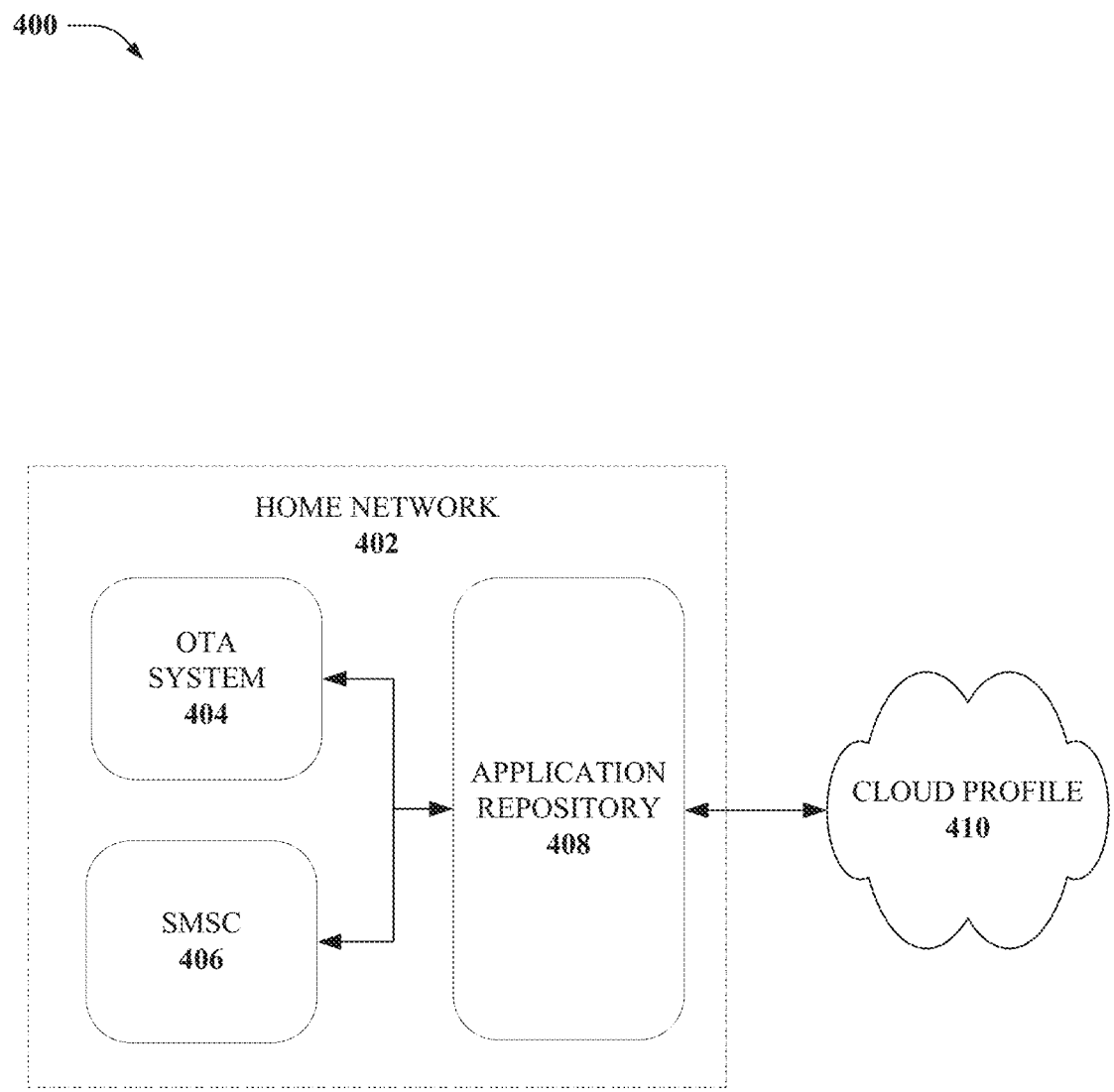
FIG. 4 illustrates an example, non-limiting embodiment of a block diagram of a system comprising a network that is operable to dynamically provide services and applications in accordance with various aspects described herein.

Turning now to FIG. 4, illustrated is an example, non-limiting embodiment of a block diagram of a system (400) comprising a network that is operable to dynamically provide services and applications in accordance with various aspects described herein.

The home network 402 can receive a message with an authorization code at SMSC 406 and initiate transferring application data from an application repository 408 to the visited network via an OTA system 404. The application repository 408 can also retrieve configuration information and/or preference information associated with the application from a cloud profile 410 that is associated with a subscriber account. The application repository 408 and/or the OTA system 404 can match the security or authorization code in the message to the cloud profile in order to identify which cloud profile to copy.

Figure 5:
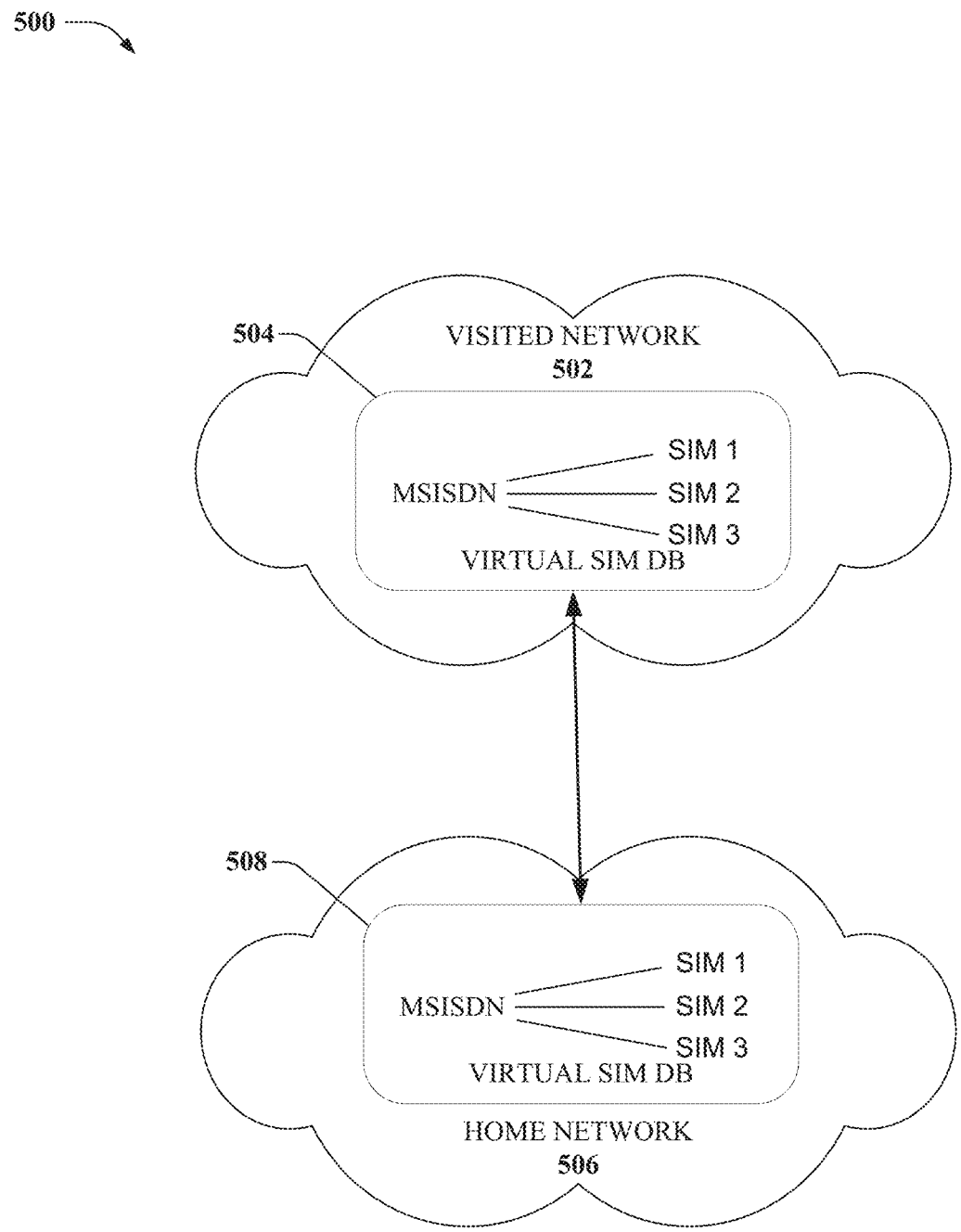
FIG. 5 illustrates an example, non-limiting embodiment of a block diagram of a system comprising a network that is operable to dynamically provide services and applications in accordance with various aspects described herein.

Turning now to FIG. 5, illustrated is an example, non-limiting embodiment of a block diagram of a system (500) comprising a network that is operable to dynamically provide services and applications in accordance with various aspects described herein.

A virtual SIM database 504 on a visited network 502 can synchronize account information with a virtual SIM database 508 on a home network 506. The account information can include MSISDN numbers that are associated with various SIM identities. In an embodiment, if a mobile device on the visited network 502 is programmed with applications and services via over the air programming with application data retrieved from home network 506, and sends the MSISDN identifying information to virtual SIM database 504 on visited network 502, virtual SIM database 504 can forward that identifying information to virtual SIM database 508 on home network 506. In that way, if the mobile device is later used on the home network 506, a record of the application transaction from before will be saved on the home network.

Figure 6:
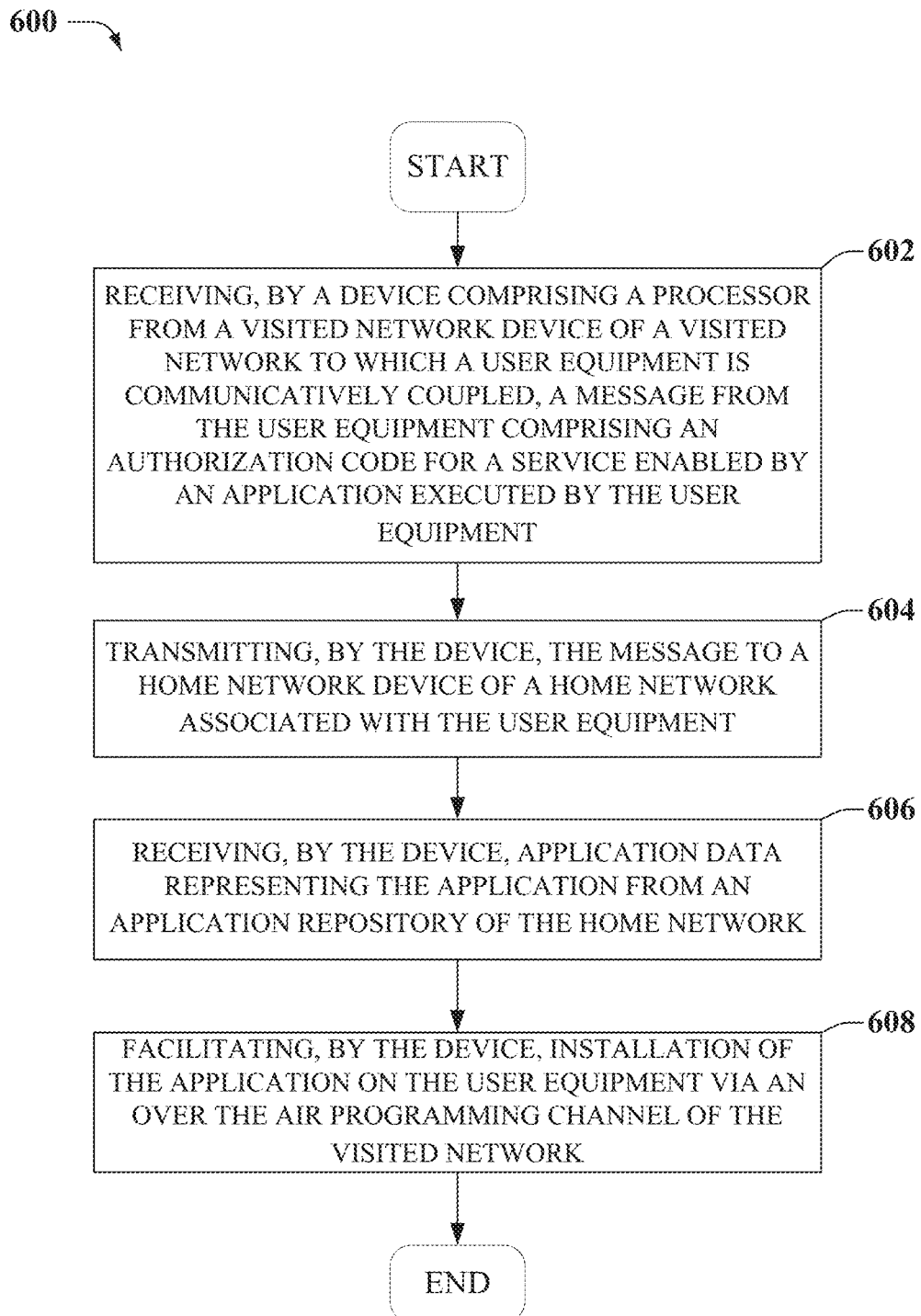
FIG. 6 illustrates a flow diagram of an example, non-limiting embodiment of a method for dynamically providing applications and services as described herein.
Figure 7:
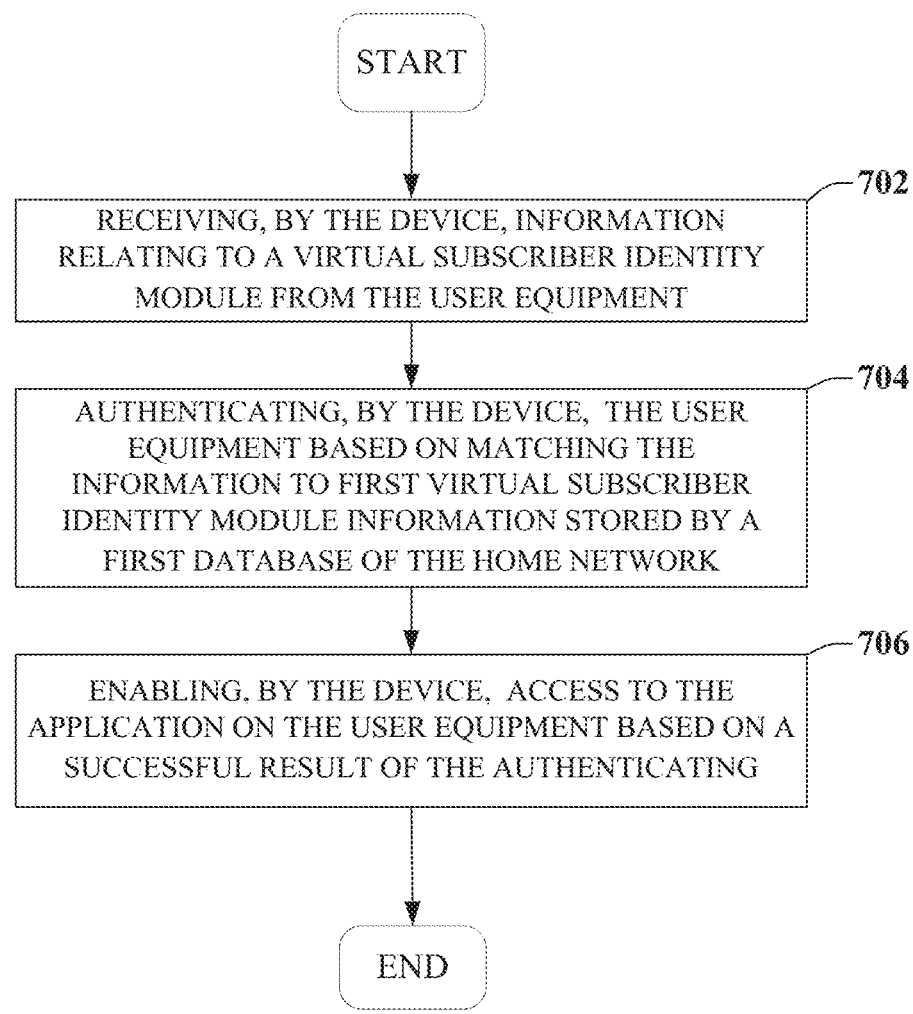
FIG. 7 illustrates a flow diagram of an example, non-limiting embodiment of a method for dynamically providing applications and services as described herein.
Figure 8:
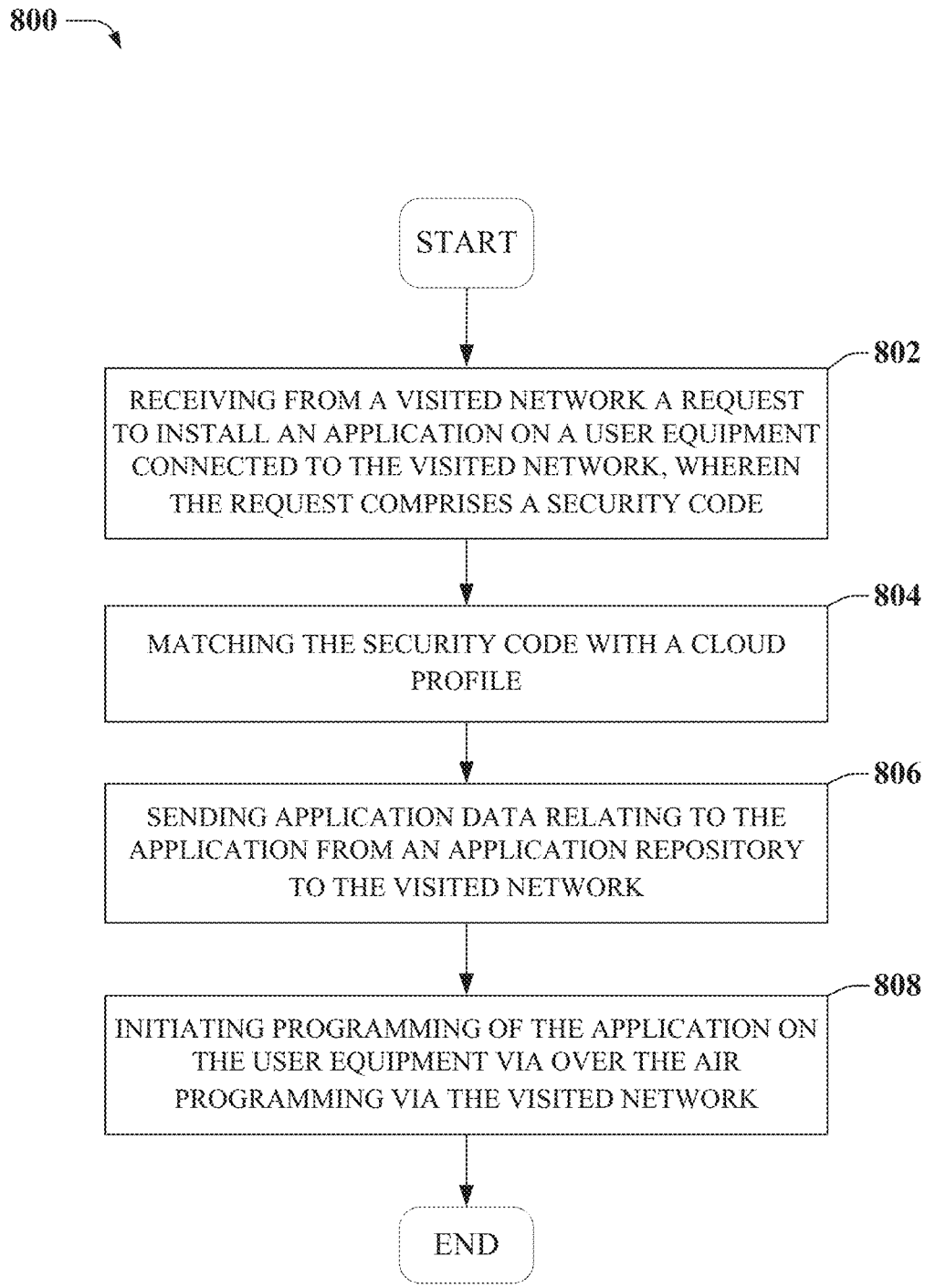
FIG. 8 illustrates a flow diagram of an example, non-limiting embodiment of a method for dynamically providing applications and services as described herein.

FIGS. 6-8 illustrates processes in connection with the aforementioned systems. The processes in FIGS. 6-8 can be implemented for example by the systems illustrated in FIGS. 1-5. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates a flow diagram of an example, non-limiting embodiment of a method 600 for dynamically providing applications and services as described herein.

Method 600 can begin at 602 where the method includes receiving, by a device comprising a processor from a visited network device of a visited network to which a user equipment is communicatively coupled, a message from the user equipment comprising an authorization code for a service enabled by an application executed by the user equipment. The message can be received at a SMSC on the visited network (e.g., SMSC 208).

At 604, the method includes transmitting, by the device, the message to a home network device of a home network associated with the user equipment. The SMSC on the visited network can send the message containing the authorization code to an SMSC on the home network (e.g., SMSC 312).

At 606, the method includes receiving, by the device, application data representing the application from an application repository of the home network. The application data can be received by the over the air programming system on the visited network (e.g., OTA system 206).

At 608, the method includes facilitating, by the device, installation of the application on the user equipment via an over the air programming channel of the visited network. The installation can be configured to automatically start once the application data transfer to the mobile device has completed, or can be started based on a prompt by the OTA system.

FIG. 7 illustrates a flow diagram of an example, non-limiting embodiment of a method 700 for dynamically providing applications and services as described herein.

Method 700 can begin at 702 where the method comprises receiving, by the device, information relating to a virtual subscriber identity module from the user equipment.

At method step 704, the method comprises authenticating, by the device, the user equipment based on matching the information to first virtual subscriber identity module information stored by a first database of the home network. At 706, the method comprises enabling, by the device, access to the application on the user equipment based on a successful result of the authenticating.

Turning now to FIG. 8, illustrates a flow diagram of an example, non-limiting embodiment of a method 800 for dynamically providing applications and services as described herein.

Method 800 can begin at 802 where the method comprises receiving, from a first network device of a visited network, a request to install an application on a user equipment connected to the visited network, wherein the request comprises a security code. At 804 the method comprises matching the security code with corresponding information represented in a cloud profile account stored by a second network device of a home network. At 806, the method comprises sending application data relating to the application received from an application repository to the visited network. At 808, the method comprises initiating programming of the application on the user equipment using over the air programming via the first network device of the visited network.

Figure 9:
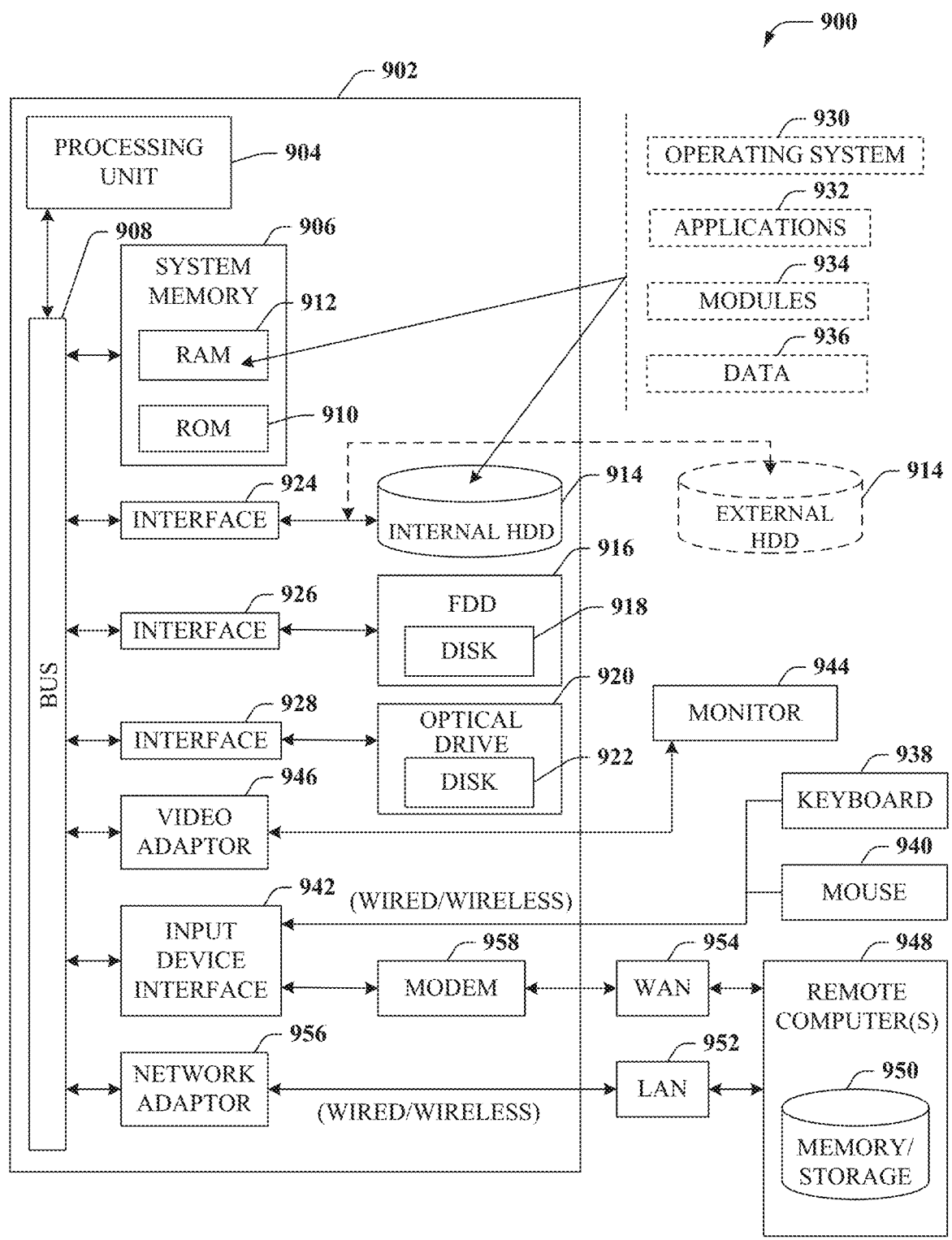
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, such computing environment can be or be included within any of the previous systems 200, 300, 400, and/or 500, e.g., with respect to executing one or more processes, methods, etc. disclosed herein (e.g., 600, 700, and/or 800).

In order to provide additional context for various embodiments described herein, FIG. 9 and the following discussion are intended to provide a brief, general description of a suitable computing environment 900 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 9, the example computing environment 900 for implementing various embodiments of the aspects described herein comprises a computer 902, the computer 902 comprising a processing unit 904, a system memory 906 and a system bus 908. The system bus 908 couples system components comprising, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 comprises ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also comprise a high-speed RAM such as static RAM for caching data.

The computer 902 further comprises an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, comprising an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can comprise a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically comprises other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically comprises many or all of the elements described relative to the computer 902, although, for purposes of brevity, only a memory/storage device 950 is illustrated. The logical connections depicted comprise wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also comprise a wireless AP disposed thereon for communicating with the wireless adapter 956.

When used in a WAN networking environment, the computer 902 can comprise a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 BaseT wired Ethernet networks used in many offices.

In an embodiment of the subject application, the computer 1002 can provide the environment and/or setting in which one or more of the dynamic secure mobile network systems disclosed in FIGS. 1-6 can be operated from.

Figure 10:
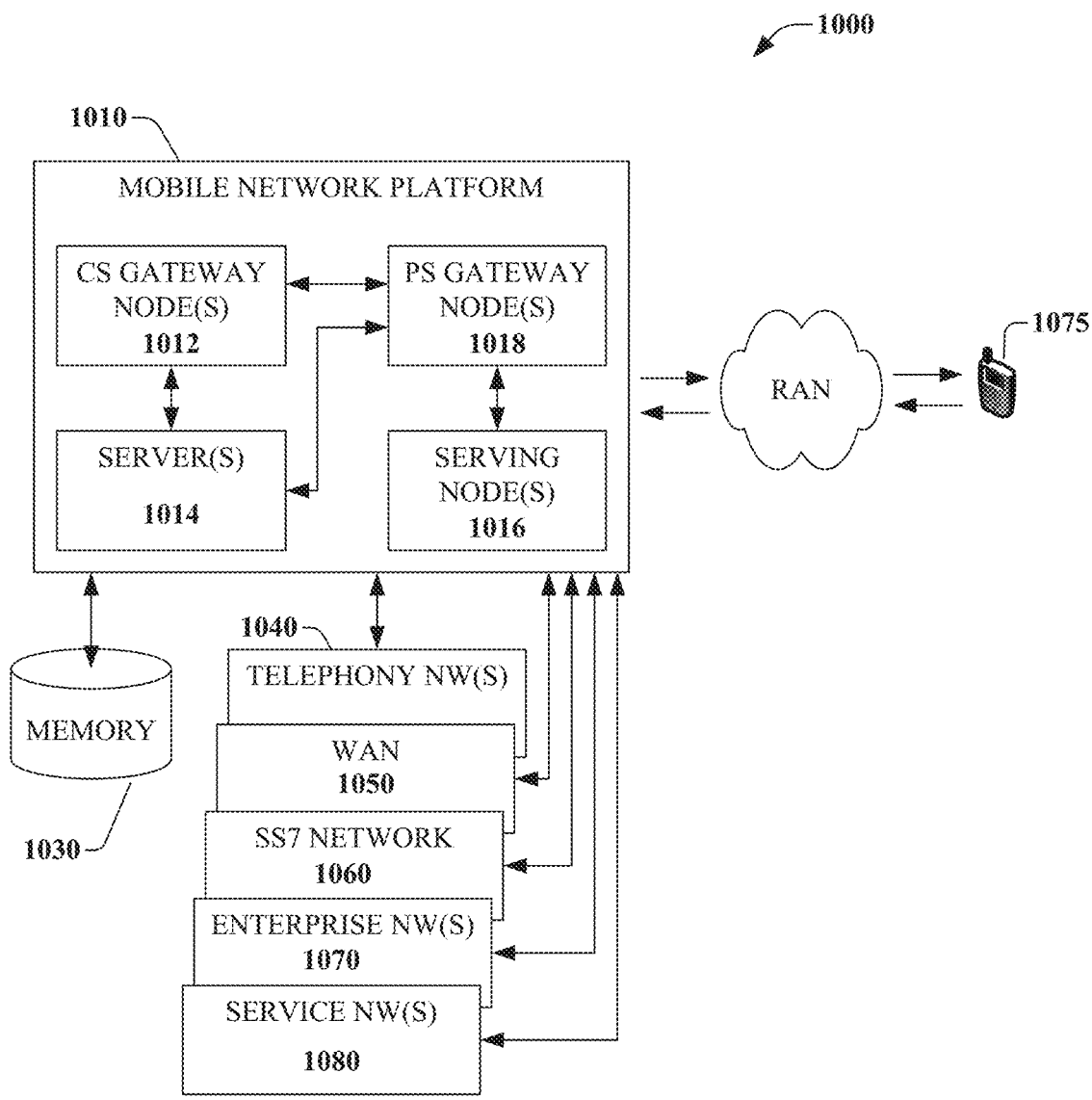
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 comprises CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication. Mobile network platform 1010 can also comprise the MMEs, HSS/PCRFs, SGWs, and PGWs disclosed herein.

In addition to receiving and processing CS-switched traffic and signaling, PS gateway node(s) 1018 can authorize and authenticate PS-based data sessions with served mobile devices. Data sessions can comprise traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also comprises serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can comprise a utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can comprise one or more processors configured to confer at least in part the functionality of macro network platform 1010. To that end, the one or more processor can execute code instructions stored in memory 1030, for example. It is should be appreciated that server(s) 1014 can comprise a content manager 1015, which operates in substantially the same manner as described hereinbefore.

In example embodiment 1000, memory 1030 can store information related to operation of wireless network platform 1010. Other operational information can comprise provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIGS. 9 and 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, field programmable gate array, graphics processor, or software defined radio reconfigurable processor and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criterion which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:

in response to receiving, by a visited network device comprising a processor and corresponding to a visited network, a short message service message from a first user equipment of a subscriber of a service corresponding to a home network, sending, by the visited network device, the short message service message to a home network device of the home network to facilitate programming an application on the first user equipment, wherein the short message service message comprises a security code and a request to install the application on the first user equipment to facilitate an access of the service via the visited network, and wherein the application has been installed on a second user equipment of the subscriber; and in response to determining that the security code is represented by a cloud profile of the subscriber of the service, facilitating, via the visited network device, the programming of the application on the first user equipment using over the air programming.

2. The method of claim 1, wherein the facilitating the programming comprises:

receiving application data corresponding to the application from an application repository of the home network.

3. The method of claim 2, further comprising:

receiving, by the visited network device of the visited network, application preference information associated with the cloud profile.

4. The method of claim 1, further comprising:

in response to receiving an international mobile subscriber identity from the first user equipment, enabling, via the visited network device based on a verification of the international mobile subscriber identity, the application on the first user equipment to facilitate the access of the service.

5. The method of claim 4, wherein the receiving the international mobile subscriber identity comprises:

storing the international mobile subscriber identity in a virtual subscriber identity module storage device of the visited network.

6. The method of claim 5, wherein the virtual subscriber identity storage device is a first virtual storage device, and further comprising:

sending, by the visited network device of the visited network via the first virtual storage device, the international mobile subscriber identity to a second virtual storage device of the home network.

7. A system, comprising:

a processor; and a memory that stores executable instructions that, when executed by the processor, facilitate performance of operations, comprising:

in response to receiving, from a mobile device via a first wireless network, a short message service message comprising a security code and a request to install an application on the first mobile device to facilitate an access of a wireless service via the first wireless network, sending the short message service message to a device of a second wireless network to facilitate, via a network device of the first wireless network, an installation of the application on the mobile device, wherein the application has been installed on another mobile device to facilitate another access of the wireless service via the first wireless network; and in response to the security code being determined to correspond to information represented by cloud profile information that has been stored in a storage device of the second wireless network, facilitating the installation of the application on the first mobile device using over the air programming.

8. The system of claim 7, wherein the operations further comprise:

receiving application data from an application repository of the second wireless network, wherein the application data comprises configuration information of the application.

9. The system of claim 8, wherein the facilitating the installation comprises:

based on the application data, configuring the application on the mobile device.

10. The system of claim 7, wherein the facilitating the installation comprises:

receiving an international mobile subscriber identity from the mobile device; and in response to verification of the international mobile subscriber identity, enabling the application on the mobile device to facilitate the access of the wireless service via the first wireless network.

11. The system of claim 10, wherein the operations further comprise:

storing the international mobile subscriber identity in a virtual subscriber identity module storage device of the first wireless network.

12. The system of claim 11, wherein the virtual subscriber identity module storage device is a first virtual storage device, and wherein the operations further comprise:

sending, via the first virtual storage device, the international mobile subscriber identity to a second virtual storage device of the second wireless network.

13. A non-transitory machine-readable medium, comprising executable instructions that, when executed by a processor, facilitate performance of operations comprising:

receiving, from a first network device of a visited network, a request to install an application on a first user equipment communicably coupled to the visited network, wherein the request is received via a short message service message comprising a security code; and in response to relaying the short message service to a second network device of a home network to facilitate, via the first network device of the visited network, installing the application on the first user equipment, and in response to matching the security code with information represented in a cloud profile account that has been stored within a storage device of the home network, initiating, via the first network device of the visited network, the installing of the application on the first user equipment, wherein the application has been installed on a second user equipment that is associated with the home network.

14. The non-transitory machine-readable medium of claim 13, wherein the initiating the installing comprises:

receiving, via the cloud profile account, preference information associated with the application from the second network device; and based on the preference information, initiating the installing of the application on the first user equipment.

15. The non-transitory machine-readable medium of claim 14, wherein the operations further comprise:
  in response to completion of the installing of the application on the first user equipment, receiving authentication information comprising a mobile subscriber integrated services for digital network number.

16. The non-transitory machine-readable medium of claim 15, wherein the operations further comprise:
  in response to the mobile subscriber integrated services for digital network number being authenticated based on the cloud profile account, enabling access to the application on the first user equipment.

17. The non-transitory machine-readable medium of claim 15, wherein the operations further comprise:
  storing the mobile subscriber integrated service for digital network number in a virtual subscriber identity module storage device of the visited network.

18. The non-transitory machine-readable medium of claim 13, wherein the visited network is associated with a first radio access network protocol and the home network is associated with a second radio access network protocol that is different from the first radio access network protocol.

19. The non-transitory machine-readable medium of claim 13, wherein the operations further comprise:
  in response to receiving an international mobile subscriber identity from the first user equipment, enabling, via the first network device based on a verification of the international mobile subscriber identity, the application on the first user equipment.

20. The non-transitory machine-readable medium of claim 19, wherein the receiving the international mobile subscriber identity comprises:
  storing the international mobile subscriber identity in a virtual subscriber identity module storage device of the visited network to facilitate the enabling of the application on the first user equipment.

* * * * *